United States Patent
Xu et al.

(10) Patent No.: US 10,244,426 B2
(45) Date of Patent: Mar. 26, 2019

(54) FREQUENCY ERROR DETECTION WITH PBCH FREQUENCY HYPOTHESIS

(71) Applicant: QUALCOMM Incorporated, San Diego, CA (US)

(72) Inventors: Huilin Xu, San Diego, CA (US); Alexei Gorokhov, San Diego, CA (US); Mariam Motamed, Redwood City, CA (US); Raghu Challa, San Diego, CA (US); Joshua MacDonald, Superior, CO (US); Kai Xie, San Diego, CA (US); Vivek Padi, San Diego, CA (US); Alex Mateen, Boulder, CO (US); Juchuan Ma, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 247 days.

(21) Appl. No.: 14/799,515

(22) Filed: Jul. 14, 2015

(65) Prior Publication Data
US 2016/0057653 A1 Feb. 25, 2016

Related U.S. Application Data

(60) Provisional application No. 62/039,284, filed on Aug. 19, 2014.

(51) Int. Cl.
*H04L 27/00* (2006.01)
*H04L 27/26* (2006.01)
(Continued)

(52) U.S. Cl.
CPC ......... *H04W 28/0289* (2013.01); *H04L 27/00* (2013.01); *H04L 27/2657* (2013.01);
(Continued)

(58) Field of Classification Search
CPC .......... H04W 28/0289; H04L 27/2657; H04L 27/2698
See application file for complete search history.

(56) References Cited

U.S. PATENT DOCUMENTS

| | | | |
|---|---|---|---|
| 6,980,589 B1 * | 12/2005 | Babb | H03J 1/005 375/222 |
| 8,270,509 B2 | 9/2012 | Lindoff et al. | |

(Continued)

FOREIGN PATENT DOCUMENTS

| | | |
|---|---|---|
| EP | 2 490 389 A1 | 8/2012 |
| WO | WO-2004/023679 A2 | 3/2004 |
| WO | WO-2011/002790 A1 | 1/2011 |

OTHER PUBLICATIONS

International Search Report and Written Opinion—PCT/US2015/040626—ISA/EPO—dated Oct. 16, 2015. (11 total pages).

*Primary Examiner* — Gregory B Sefcheck
*Assistant Examiner* — Jael M Ulysse
(74) *Attorney, Agent, or Firm* — Arent Fox, LLP

(57) ABSTRACT

Aspects of frequency error detection with Physical Broadcast CHannel (PBCH) frequency hypothesis are described. For example, a method and apparatus are disclosed for frequency tracking in a user equipment (UE) may include detecting a change in frequency that exceeds a pull-in range of a frequency tracking loop (FTL) of the UE. The method and apparatus may also include identifying a tracking recovery frequency in response to the change in frequency being detected, wherein the tracking recover frequency is identified from a set of frequency hypotheses and based on decoding of the PBCH received by the UE. The method and apparatus may further include updating the FTL with the tracking recovery frequency.

30 Claims, 11 Drawing Sheets

(51) Int. Cl.
*H04W 28/02* (2009.01)
*H04W 56/00* (2009.01)
*H04W 76/28* (2018.01)

(52) U.S. Cl.
CPC ..... *H04L 27/2695* (2013.01); *H04W 56/0035* (2013.01); *H04W 76/28* (2018.02); *H04L 2027/0034* (2013.01); *H04L 2027/0065* (2013.01)

(56) References Cited

U.S. PATENT DOCUMENTS

| | | | |
|---|---|---|---|
| 8,494,070 B2 | 7/2013 | Luo et al. | |
| 8,582,505 B2 | 11/2013 | Luo et al. | |
| 8,605,835 B2 | 12/2013 | Matsumura | |
| 8,675,788 B2 | 3/2014 | Andgart et al. | |
| 2002/0065047 A1* | 5/2002 | Moose | H04L 5/0048 455/67.11 |
| 2002/0177450 A1* | 11/2002 | Vayanos | G01S 11/10 455/456.1 |
| 2003/0054768 A1* | 3/2003 | Challa | H04L 27/0014 455/63.1 |
| 2004/0009757 A1* | 1/2004 | Subrahmanya | H04B 1/712 455/134 |
| 2004/0196915 A1* | 10/2004 | Gupta | H04L 27/266 375/260 |
| 2005/0163263 A1* | 7/2005 | Gupta | H04L 27/2656 375/343 |
| 2005/0276357 A1* | 12/2005 | Wang | H04B 1/707 375/340 |
| 2006/0221810 A1* | 10/2006 | Vrcelj | H04L 27/2656 370/208 |
| 2006/0285599 A1* | 12/2006 | Seki | H04L 25/022 375/260 |
| 2007/0217525 A1* | 9/2007 | Vrcelj | H04L 27/2657 375/260 |
| 2007/0218931 A1* | 9/2007 | Beadle | H04B 7/18589 455/502 |
| 2009/0041104 A1* | 2/2009 | Bogdan | H03K 5/15013 375/226 |
| 2009/0215419 A1* | 8/2009 | Farmer | G01S 19/29 455/257 |
| 2009/0296864 A1* | 12/2009 | Lindoff | H04B 17/336 375/357 |
| 2010/0075684 A1* | 3/2010 | Iwamura | H04W 48/12 455/449 |
| 2010/0080112 A1* | 4/2010 | Bertrand | H04L 27/2657 370/208 |
| 2010/0135423 A1* | 6/2010 | Lindoff | H04L 27/2657 375/260 |
| 2010/0296467 A1* | 11/2010 | Pelletier | H04W 74/002 370/329 |
| 2010/0330992 A1* | 12/2010 | Bhattacharjee | H04W 52/028 455/436 |
| 2010/0331019 A1* | 12/2010 | Bhattacharjee | H04W 52/0229 455/458 |
| 2010/0331030 A1* | 12/2010 | Nory | H04L 5/0053 455/509 |
| 2011/0001886 A1* | 1/2011 | Tsai | H04L 27/0014 348/731 |
| 2011/0009095 A1* | 1/2011 | Uemura | H04W 48/14 455/411 |
| 2011/0013730 A1* | 1/2011 | Mansson | H04B 7/0689 375/340 |
| 2011/0092231 A1* | 4/2011 | Yoo | H04B 1/7097 455/501 |
| 2011/0158367 A1* | 6/2011 | Banister | H03J 1/005 375/376 |
| 2011/0164671 A1* | 7/2011 | Matsumura | H04L 27/2659 375/229 |
| 2011/0216732 A1* | 9/2011 | Maeda | H04W 4/08 370/329 |
| 2011/0280294 A1* | 11/2011 | Luo | H04L 25/0204 375/224 |
| 2011/0292824 A1* | 12/2011 | Uemura | H04W 56/00 370/252 |
| 2011/0311005 A1* | 12/2011 | Andgart | H04L 27/2657 375/344 |
| 2012/0034917 A1* | 2/2012 | Kazmi | H04W 48/16 455/434 |
| 2012/0057488 A1* | 3/2012 | Li | H04B 7/0684 370/252 |
| 2012/0113844 A1* | 5/2012 | Krishnamurthy | H04L 1/0026 370/252 |
| 2012/0122495 A1* | 5/2012 | Weng | H04W 68/025 455/458 |
| 2012/0294173 A1* | 11/2012 | Su | H04W 24/10 370/252 |
| 2013/0003672 A1* | 1/2013 | Dinan | H04L 1/00 370/329 |
| 2013/0083753 A1* | 4/2013 | Lee | H04W 72/0453 370/329 |
| 2013/0143502 A1* | 6/2013 | Kazmi | H04W 88/06 455/62 |
| 2013/0182630 A1* | 7/2013 | Yamamoto | H04J 11/0073 370/312 |
| 2013/0281038 A1* | 10/2013 | Ezaki | H04B 17/004 455/226.1 |
| 2013/0308481 A1* | 11/2013 | Kazmi | H04W 24/02 370/252 |
| 2013/0329721 A1* | 12/2013 | Doetsch | H04L 27/0014 370/350 |
| 2013/0329815 A1* | 12/2013 | Kenney | H04B 1/14 375/259 |
| 2014/0010324 A1* | 1/2014 | Kenney | H04L 27/22 375/284 |
| 2014/0018070 A1* | 1/2014 | Ji | H04W 48/16 455/434 |
| 2014/0098663 A1* | 4/2014 | Vos | H04W 72/0486 370/230 |
| 2014/0126498 A1* | 5/2014 | Koorapaty | H04L 5/0098 370/329 |
| 2015/0223258 A1* | 8/2015 | Jung | H04W 48/12 455/452.1 |
| 2016/0043843 A1* | 2/2016 | Liu | H04L 5/0048 370/329 |

* cited by examiner

FREQUENCY ERROR DETECTION WITH PBCH FREQUENCY HYPOTHESIS

CLAIM OF PRIORITY UNDER 35 U.S.C. § 119

The present application for patent claims priority to Provisional Application No. 62/039,284 entitled "FREQUENCY ERROR DETECTION WITH PBCH FREQUENCY HYPOTHESIS" filed Aug. 19, 2014, which is assigned to the assignee hereof and hereby expressly incorporated in its entirety by reference herein.

BACKGROUND

The present disclosure relates generally to communication systems, and more particularly, to frequency error detection with Physical Broadcast CHannel (PBCH) frequency hypothesis.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

In some wireless communication networks, a user equipment (UE) may fail to detect and track a communications frequency because changes in the frequency that occur in certain scenarios may exceed the pull-in range of a frequency tracking loop (FTL). In such scenarios, large frequency errors may result in the UE having to go out of service (OOS) or declare a radio link failure (RLF), requiring a repeat of the initial acquisition procedure along with the overhead incurred by having to do so. Thus, improvements in frequency tracking recovery are desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with an aspect, a present method is described that relates to frequency tracking in a UE, the method comprises detecting a change in frequency that exceeds a pull-in range of a FTL of the UE based on one or more characteristics of a wireless channel; identifying a tracking recovery frequency in response to the change in frequency being detected, wherein the tracking recover frequency is identified from a set of frequency hypotheses and based on decoding of a PBCH received by the UE; and updating the FTL with the tracking recovery frequency.

In another aspect, a computer-readable medium storing computer executable code for frequency tracking in a UE is described that comprises code for detecting a change in frequency that exceeds a pull-in range of a FTL of the UE; code for identifying a tracking recovery frequency in response to the change in frequency being detected, wherein the tracking recover frequency is identified from a set of frequency hypotheses and based on decoding of a PBCH received by the UE; and code for updating the FTL with the tracking recovery frequency.

In a further aspect, an apparatus is described that relates to frequency tracking in a UE, the apparatus comprises means for detecting a change in frequency that exceeds a pull-in range of a FTL of the UE; means for identifying a tracking recovery frequency in response to the change in frequency being detected, wherein the tracking recover frequency is identified from a set of frequency hypotheses and based on decoding of a PBCH received by the UE; and means for updating the FTL with the tracking recovery frequency.

In another aspect, an apparatus is described that relates to frequency tracking in a UE, the apparatus comprises an detector configured to detect a change in frequency that exceeds a pull-in range of a FTL of the UE; a frequency identifier configured to identify a tracking recovery frequency in response to the change in frequency being detected, wherein the tracking recover frequency is identified from a set of frequency hypotheses and based on decoding of a PBCH received by the UE; and a FTL updater configured to update the FTL with the tracking recovery frequency.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein.

DETAILED DESCRIPTION

Figure 1:
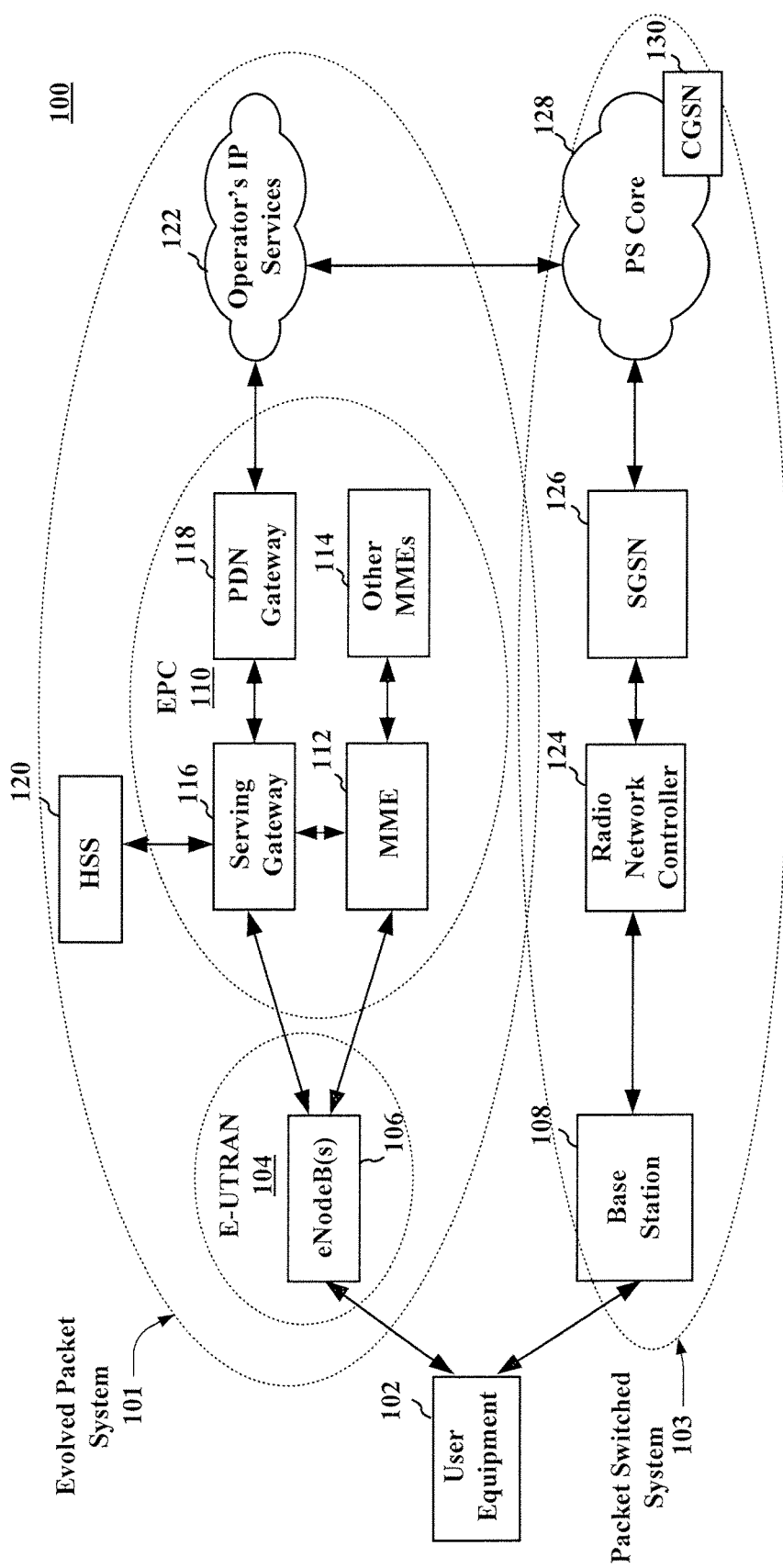
FIG. 1 is a diagram illustrating an example of a network architecture according to an aspect of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

The present aspects generally relate to frequency error detection with PBCH frequency hypothesis. A frequency tracking loop (FTL) in a UE has a limited pull-in range. In some instances, the pull-in range may also be referred to as tracking range or lock-in range, for example. The UE may fail to detect and track a frequency change if the frequency change exceeds the pull-in range of the FTL. When this happens, decoding the PBCH with several frequency hypotheses may provide a reliable solution of quickly recover frequency tracking after a large frequency change. This approach may avoid the overhead that is associated with the UE declaring out of service (OOS) or radio link failure (RLF), which requires the UE to repeat the entire initial acquisition procedure.

As such, the present methods and apparatus may involve using one or more PBCH frequency hypotheses to extend the frequency estimation range of the UE frequency tracking capability. Under certain conditions and/or characteristics that indicate that the frequency change exceeds the pull-in range of the FTL, PBCH decoding may be triggered with multiple frequency hypotheses. In general, the frequency hypothesis that has a passing cyclic redundancy check (CRC) may be used to reset frequency tracking loop.

FIG. 1 is a diagram illustrating a wireless network architecture 100 employing various apparatuses. The network architecture 100 may include an Evolved Packet System (EPS) 101. One example of a system that implements EPS 101 is a Long Term Evolution (LTE) system. LTE is a set of enhancements to the Universal Mobile Telecommunications System (UMTS) mobile standard promulgated by Third Generation Partnership Project (3GPP). The EPS 101 may include one or more UEs 102, which may include PBCH-based frequency error detection component 720 (FIG. 7) configured to perform frequency tracking recovery when large frequency errors occur by using PBCH decoding with one or more frequency hypotheses. The network architecture 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS 101 can interconnect with other access networks, such as a packet switched core (PS core) 128, a circuit switched core (CS core) 134, etc. As shown, the EPS 101 provides packet-switched services, however, as those skilled in the art will readily appreciate, the various concepts presented throughout this disclosure may be extended to networks providing circuit-switched services, such as the network associated with CS core 134.

The network architecture 100 may further include a packet switched network 103. Network 103 may be implemented using any of the CDMA2000 family of standards. Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. In one aspect, the packet switched network 103 may include base station 108, base station controller 124, Serving GPRS Support Node (SGSN) 126, PS core 128 and Combined GPRS Service Node (CGSN) 130.

The E-UTRAN may include an evolved NodeB (eNB) 106 and connection to other networks, such as packet and circuit switched networks may be facilitated through a Mobility Management Entity (MME) 112. Further, through a connection between MME 112 and SGSN 126 a logical connection may be established between eNB 106 and RNC 124. The eNB 106 provides user and control plane protocol terminations toward the UE 102. The eNB 106 may be connected to the other eNBs 106 via an X2 interface (i.e., backhaul). The eNB 106 may also be referred to by those skilled in the art as a base station, a base transceiver station, a radio base station, a radio transceiver, a transceiver function, a basic service set (BSS), an extended service set (ESS), or some other suitable terminology. The eNB 106 provides an access point to the EPC 110 for a UE 102.

Examples of UE 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. Moreover, UE 102 may include PBCH-based frequency error detection component 720 (FIG. 7) configured to perform frequency tracking recovery when large frequency errors occur by using PBCH decoding with one or more frequency hypotheses.

The eNB 106 is connected by an S1 interface to the EPC 110. The EPC 110 includes a MME 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122.

The Operator's IP Services 122 may include the Internet, the Intranet, an IP Multimedia Subsystem (IMS), and a PS Streaming Service (PSS).

As Operators initially deploy LTE based networks, system 100 may include hotspots with LTE network 101 (e.g., 3GPP coverage) with broader coverage being provided through 2x/DO networks 103 (e.g., 3GPP2 coverage). A multimode UE 102 uses a BSR procedure to periodically scan available networks, determine whether a better network is available, and switch to the better network where one is available. Currently, BSR may be achieved through use of priority rules stored in Multi-mode System Selection Files (MMSS files) provisioned in a LTE+2x/DO multi-mode UE 102. Within the files, the systems can be grouped using mobile country code (MCC). As such, UE 102 may perform a BSR procedure even in areas with no LTE coverage.

Figure 2:
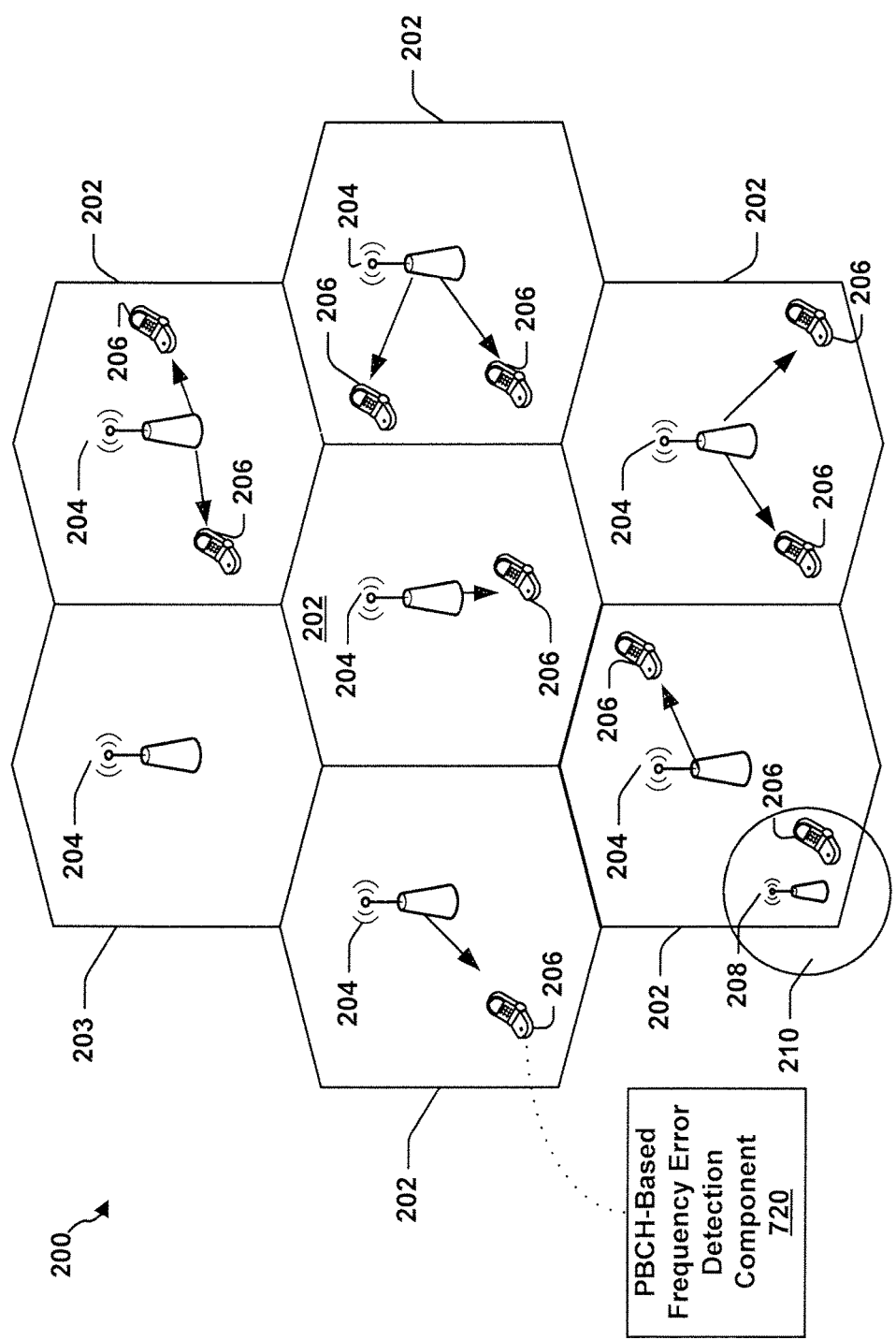
FIG. 2 is a diagram illustrating an example of an access network in according to an aspect of the present disclosure.

FIG. 2 is a diagram illustrating an example of an access network 200 in an LTE network architecture in which one or more UEs 206 may each include PBCH-based frequency error detection component 720 (FIG. 7), as discussed herein. In this example, the access network 200 is divided into a number of cellular regions (cells) 202 and 203. In an aspect, cells 202 may be configured to provide LTE and GSM coverage, while cell 203 may be configured for GSM coverage only. Other configurations, however, may also be possible. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations.

These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization.

The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
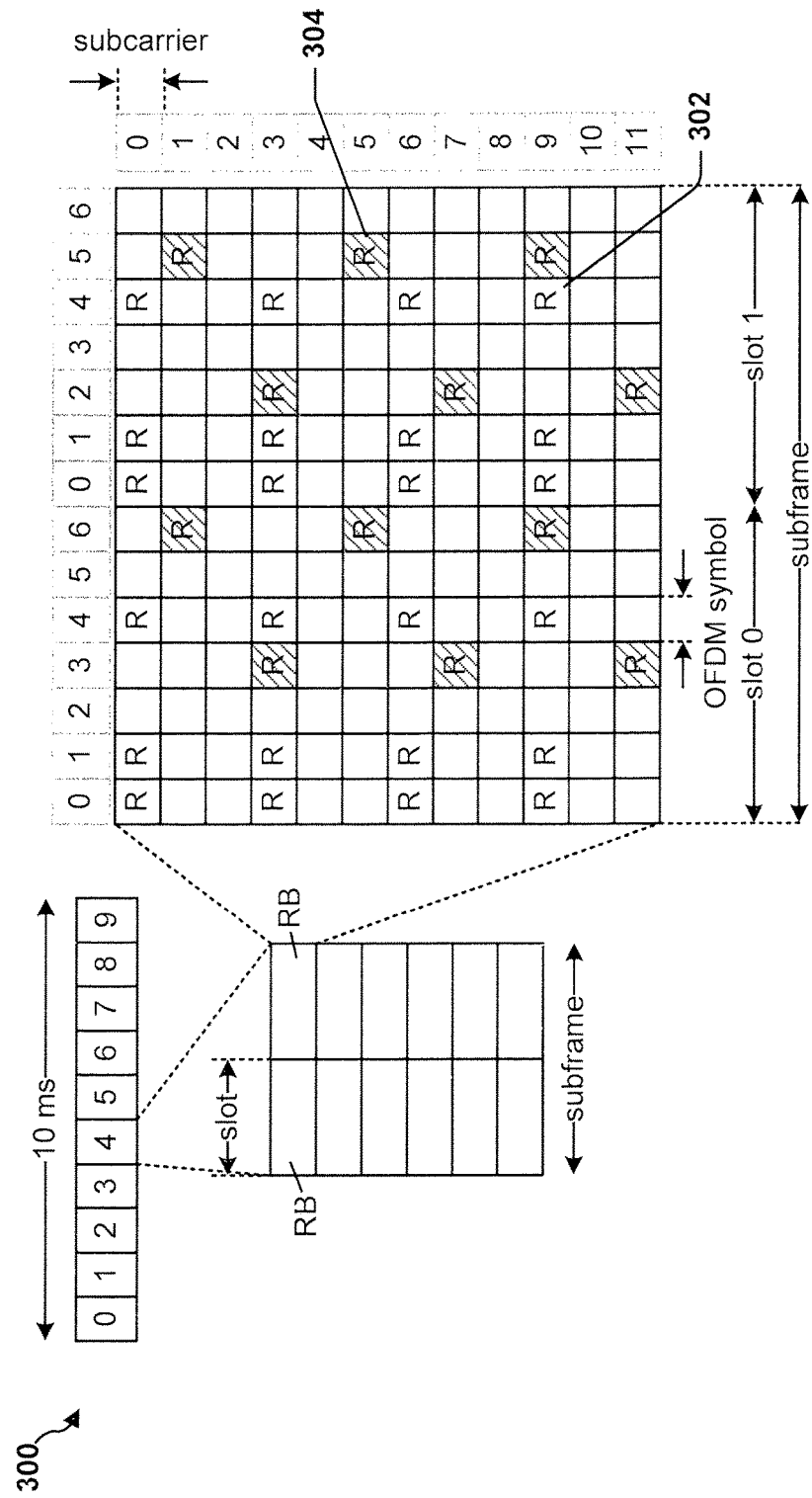
FIG. 3 is a diagram illustrating an example of a DL frame structure in LTE in accordance with an aspect of the present disclosure.

FIG. 3 is a diagram 300 illustrating an example of a DL frame structure in LTE, which may be received by a UE, such as UE 702 (FIG. 7) that may include PBCH-based frequency error detection component 720 (FIG. 7), as described herein. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE, such UE 702 of FIG. 7 including PBCH-based frequency error detection component 720, receives and the higher the modulation scheme, the higher the data rate for the UE.

Figure 4:
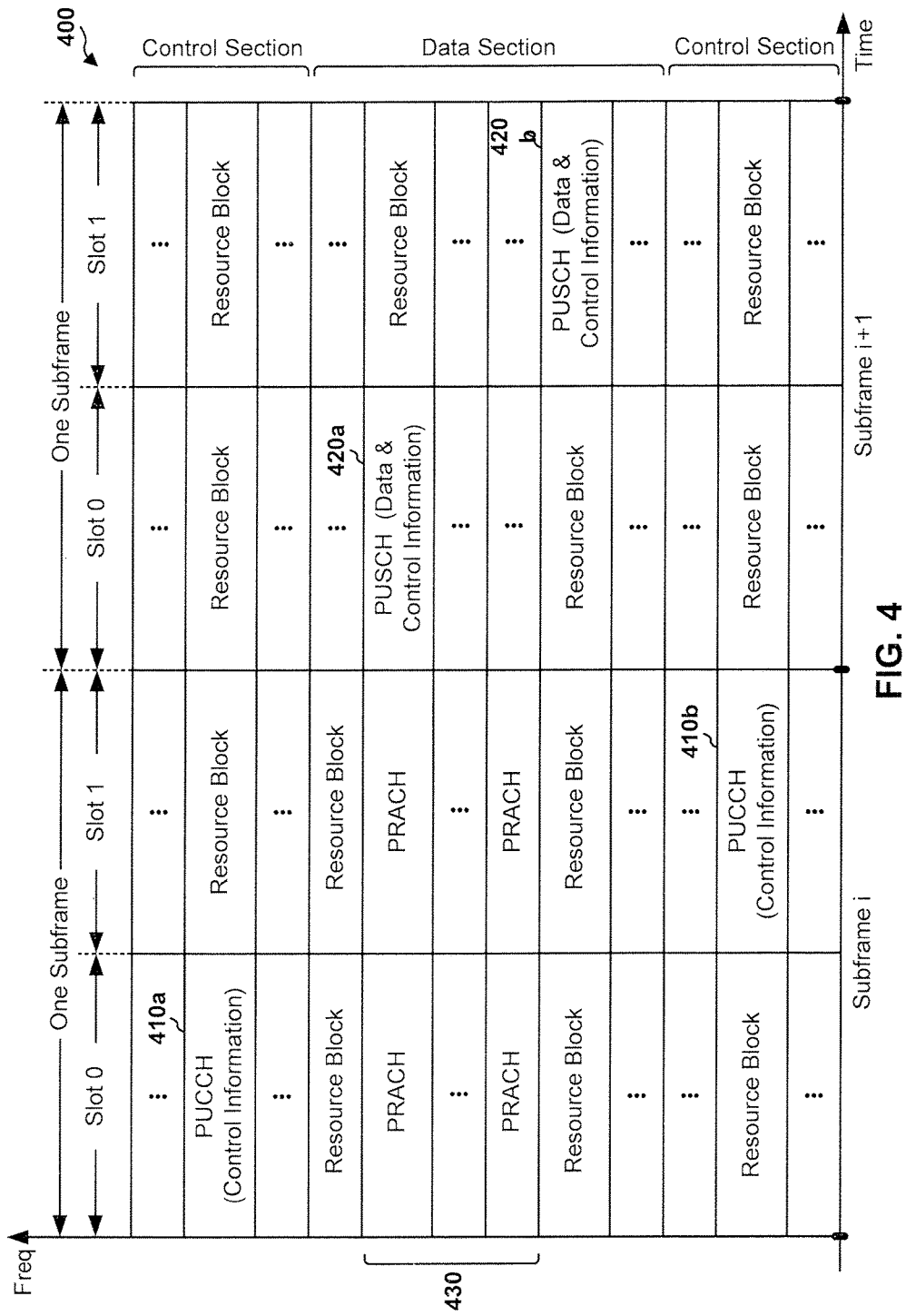
FIG. 4 is a diagram illustrating an example of an UL frame structure in LTE in accordance with an aspect of the present disclosure.

FIG. 4 is a diagram 400 illustrating an example of an UL frame structure in LTE, which may be transmitted by a UE, such as UE 702 (FIG. 7) that may include PBCH-based frequency error detection component 720 (FIG. 7), as described herein. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE, such as UE 702 (FIG. 7) including PBCH-based frequency error detection component 720, may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
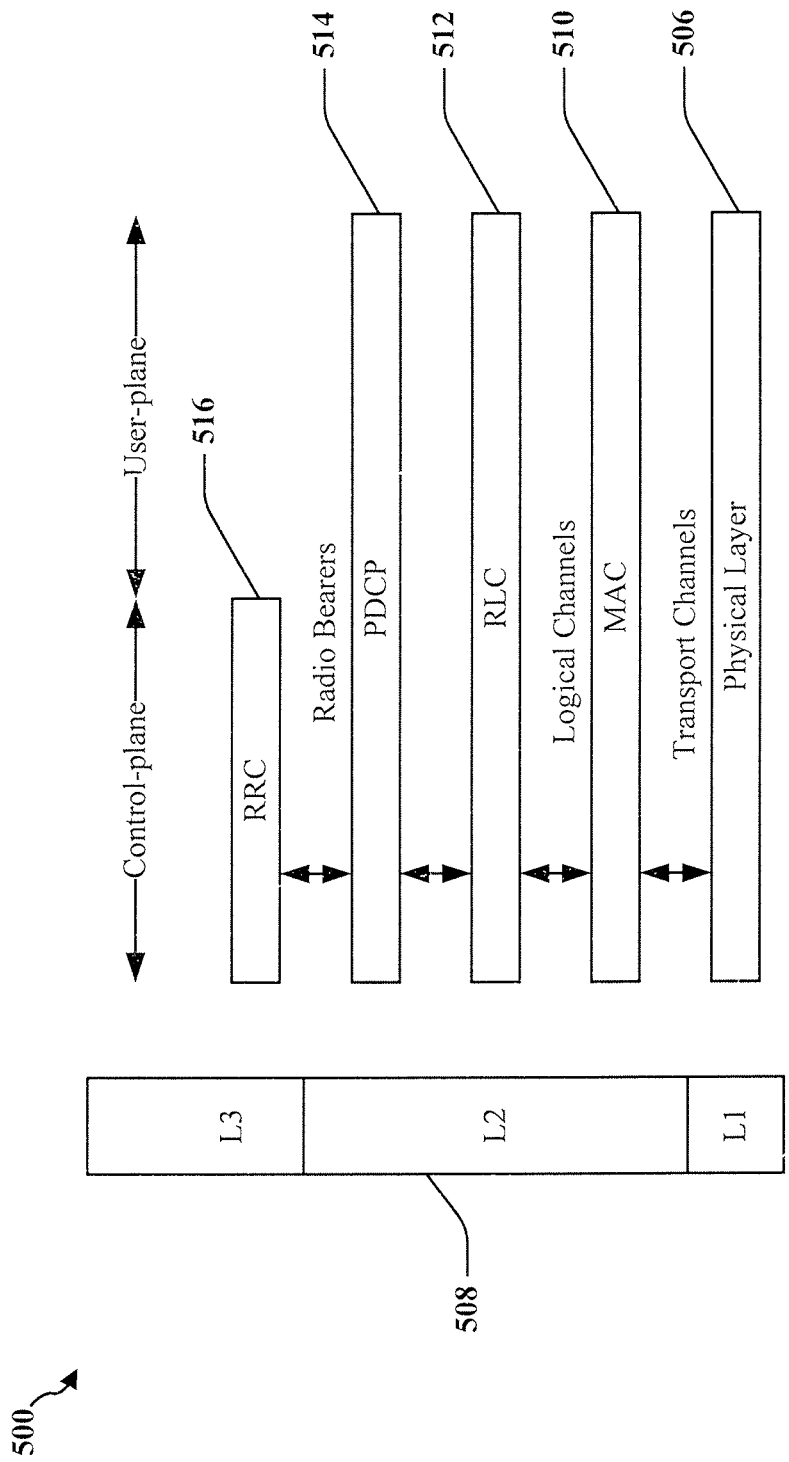
FIG. 5 is a diagram illustrating an example of a radio protocol architecture for the user and control planes in accordance with an aspect of the present disclosure.

FIG. 5 is a diagram 500 illustrating an example of a radio protocol architecture for the user and control planes in LTE. The radio protocol architecture may be used by a UE, such UE 702 (FIG. 7) that may include PBCH-based frequency error detection component 720, and an eNB, and the radio architecture includes three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
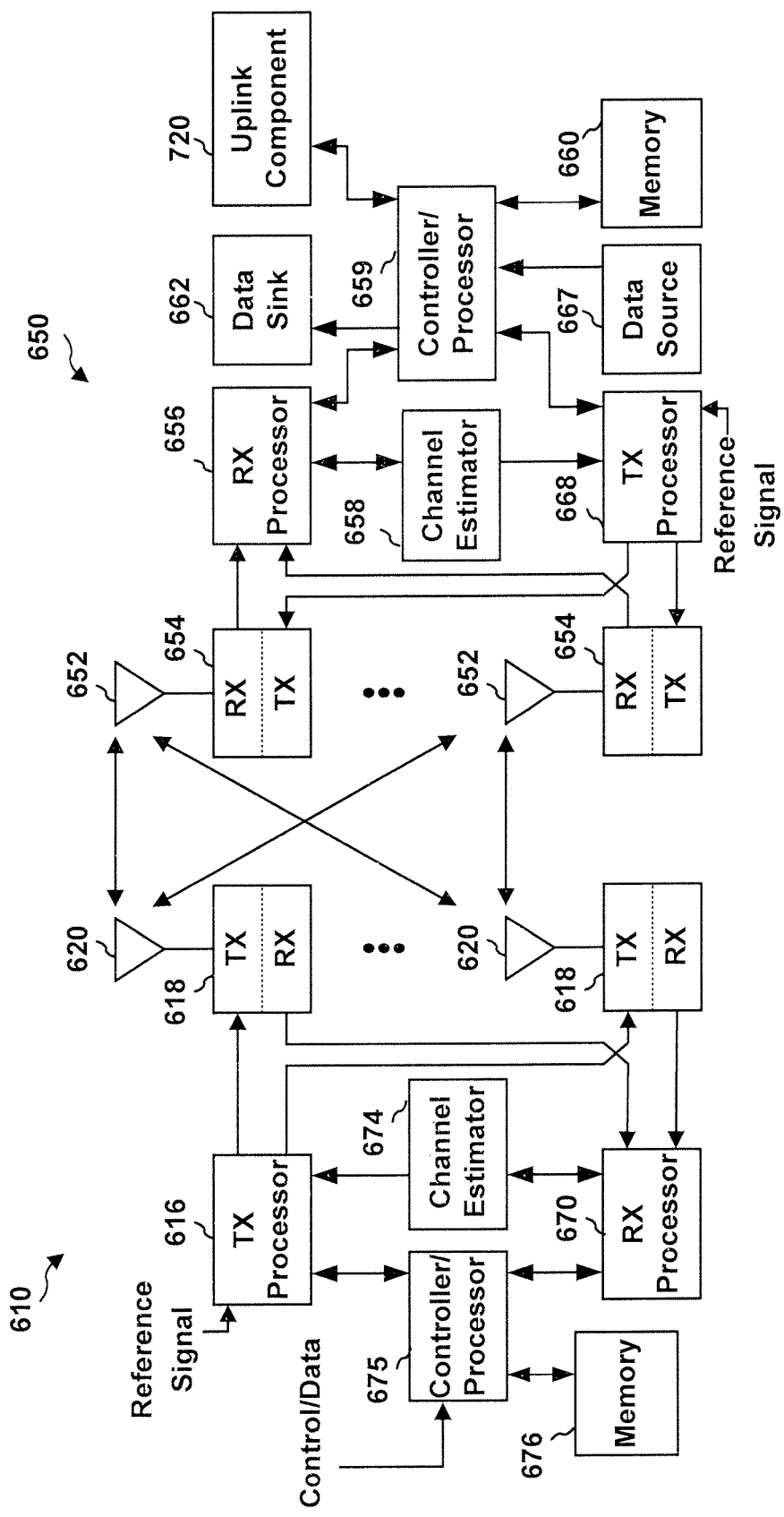
FIG. 6 is a diagram illustrating an example of an evolved Node B and user equipment in an access network in accordance with an aspect of the present disclosure.

FIG. 6 is a block diagram of an eNB 610 in communication with a UE 650 in an access network. UE 650 may be the same or similar as UE 702 including PBCH-based frequency error detection component 720 of FIG. 7. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream.

The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

As noted above with respect to frequency tracking in a UE, an issue that may arise when a UE is tracking a frequency used in wireless communications is that the frequency tracking loop or FTL of the UE has a limited pull-in range. The pull-in range may refer to the range of frequencies that can be accurately tracked. Accordingly, in certain scenarios or conditions, the UE may fail to detect and track a change in frequency when the frequency change exceeds pull-in of FTL. In a first example scenario, the UE may be in sleep state or mode when a Doppler frequency transition occurs (e.g., due to a high mobility situation), where a Doppler frequency may refer to deviation in frequency from the expected carrier frequency. In such a case, a peak Doppler frequency may be larger than half of the FTL pull-in range and the UE may wake up to a frequency error beyond the pull-in range of the FTL if sign of the Doppler frequency flips during UE sleep state. This condition may result in an error in frequency estimation leading to an attach failure or a page decoding failure.

In a second example scenario, for a UE handover when in connected mode, when the Doppler frequency difference between a serving cell and a target cell exceeds the pull-in range of the FTL, then the FTL may get aliased after the UE handover to the new cell. Aliasing may refer to the inability of the FTL to track frequency because of the large frequency error results in inconsistent or otherwise inaccurate frequency values or readings. For example, a large frequency error may result in the tracked frequency to jump from one end of the pull-in range to the opposite end of the pull-in range, a change that is not consistent with the more gradual frequency change typically expected.

In a third example scenario, for a UE reselection in idle mode, when Doppler frequency difference between a serving cell and a target cell exceeds the pull-in range of the FTL, then the FTL may get aliased after the UE reselects to the new cell.

In a fourth example scenario, the UE may be in a repeater scenario and may receive same downlink signals from two different antennas used for communication with an EnodeB. When the Doppler frequency difference between two repeaters exceeds the pull-in range of the FTL, then the FTL may get aliased after the UE crosses the middle point between the two repeaters, that is, the signal from the incoming repeater becomes stronger than the repeater from which the UE is moving away.

To address these and similar scenarios, trying out various frequency hypotheses to decode PBCH may be used to effectively extend the frequency estimation range of the UE. As noted above, example scenarios that may need to be addressed to avoid FTL alias due to quick Doppler frequency change may include, but need not be limited to: (1) UE wakes up from an offline idle mode DRX sleep; (2) UE wakes up from an online idle mode DRX sleep or UE is in connected mode; (3) cell handover; and (4) cell reselection. Using a PBCH-based approach may result in a large or broad range of frequency detection, where performance is generally guaranteed by using a frequency for which the hypothesis has passed CRC. A PBCH-based approach, however, may involve power and delay overhead because of the need to perform PBCH decoding.

One way to reduce or limit this overhead may be to trigger PBCH-based detection under certain conditions. For example, PBCH-based detection may be triggered if the estimate of instantaneous frequency error exceeds a threshold or downlink timing keeps drifting. Instantaneous frequency or IF may refer to the derivative, or the partial derivative, of the phase of a signal with respect to time. Also, new or additional frequency hypotheses need not be scheduled if at least one hypothesis has already passed CRC. The following are examples of the types of conditions or characteristics that can be used to trigger PBCH-based error/frequency detection when the frequency change exceeds the pull-in range of the FTL and frequency tracking is no longer accurate: (1) sudden large jump of instantaneous frequency error measured by FTL; (2) a large image peak in the destaggered channel estimate when the UE combines raw channel estimates from two staggered reference symbols (e.g. symbols 0 and 4); (3) large frequency error detected by synchronization sequence; and (4) large sudden phase jump detected from correlation between reference signals or synchronization signals that are apart in time (e.g., correlation is not a real positive number).

Each of these and similar conditions or characteristics may, by itself, trigger PBCH-based error/frequency detection by exceeding a respective threshold. In some instances, however, multiple characteristics may be used to trigger PBCH-based operations. In such cases, the respective threshold for one of the multiple characteristics may be different from the respective threshold for that same characteristic when the characteristic alone would trigger PBCH-based operations.

Figure 7:
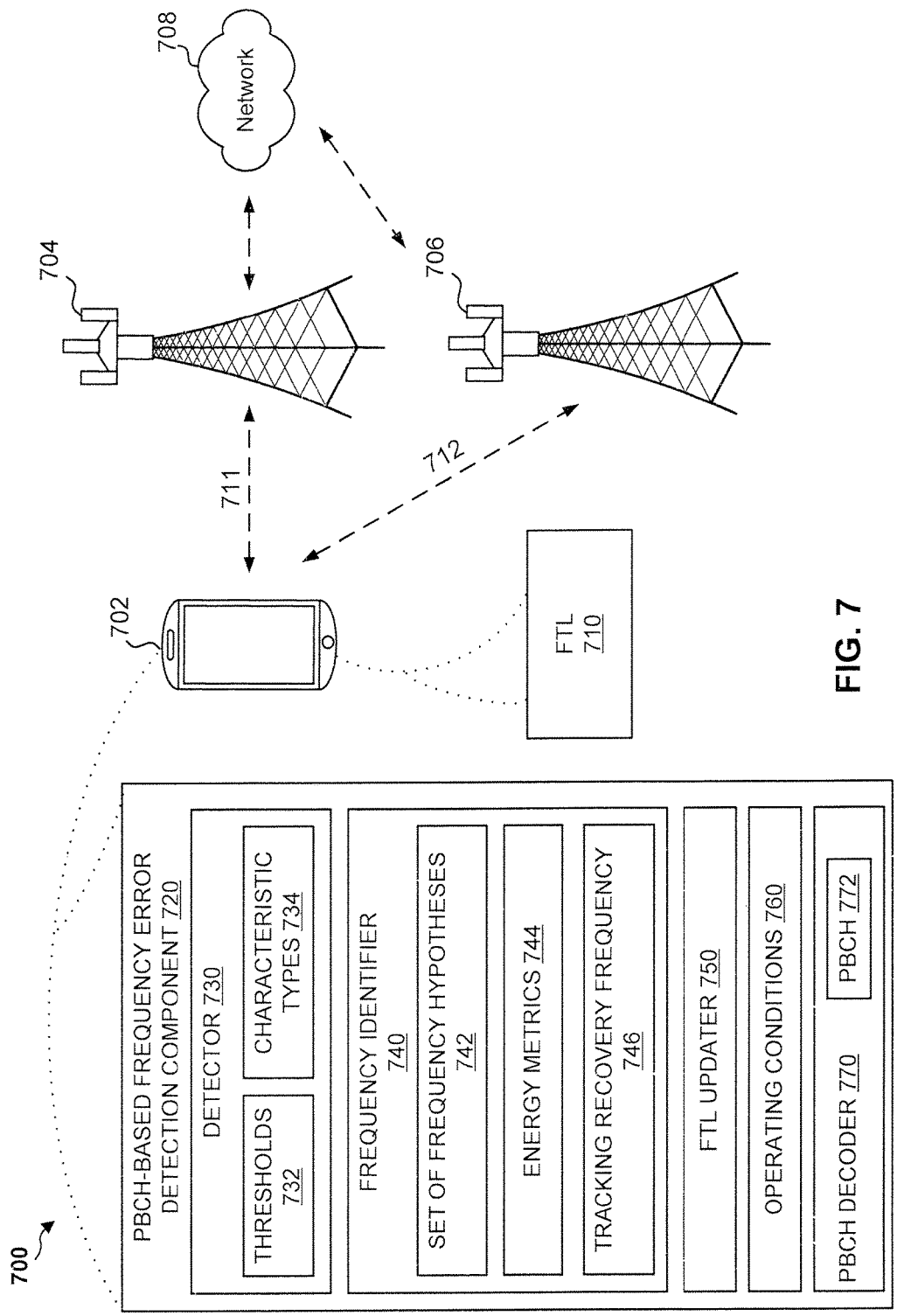
FIG. 7 is a schematic diagram of a communication network including an aspect of a PBCH-based frequency error detection component.

Referring to FIG. 7, in an aspect, a wireless communication system 700 includes at least one UE 702 in communication coverage of at least one network entity 704 and/or network entity 706. UE 702 may communicate with network 708 via network entity 704 and/or network entity 706. In other aspects, multiple UEs including UE 702 may be in communication coverage with one or more network entities, including network entity 704 and/or network entity 706. In an aspect, network entity 704 may be configured to provide both LTE and GSM coverage. For instance, UE 702 may communicate with network entity 704 and/or network entity 706 on, or using, one or more communication channels 711 and/or 712, respectively, on one or both of the uplink and downlink. In such aspects, communication channels 711 and/or 712 may utilize or facilitate communication based on one or more technology types (e.g., LTE).

It should be understood that UE 702 may communicate with one or more cells included or deployed at a network entity. In other aspects, network entity 704 may alternatively be referred to as a cell with which UE 702 maintains an RRC connected state. Moreover, network entity 706 may alternatively be referred to as a base station. Additionally, UE 702 may transmit and/or receive wireless communication to and/or from network entity 704 on the one or more communication channels 711.

In some aspects, UE 702 may also be referred to by those skilled in the art (as well as interchangeably herein) as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, a wireless transmit/receive unit, or some other suitable terminology.

Additionally, network entity 704 and/or network entity 706 may be a macrocell, small cell, picocell, femtocell, access point, relay, base station, Node B, mobile Node B, UE (e.g., communicating in peer-to-peer or ad-hoc mode with UE 702), or substantially any type of component that can communicate with UE 702 to provide wireless network access at the UE 702.

According to the present aspects, UE 702 may include FTL 710 and PBCH-based frequency error detection component 720, which may include various component and/or subcomponents configured to perform large frequency error detection with PBCH frequency hypotheses. On or more of the various component and/or subcomponents of the PBCH-based frequency error detection component 720 may be implemented in software, hardware, and/or firmware. Specifically, PBCH-based frequency error detection component 720 may be configured to adjust, update, and/or initialize FTL 710 to recover frequency tracking when FTL 710 is unable to track a frequency change because the frequency change exceeds the pull-in range of FTL 710.

In an aspect, PBCH-based frequency error detection component 720 may include detector 730 having threshold 732 and characteristic types 734. The PBCH-based frequency error detection component 720 may also include frequency identifier 740 having set of frequency hypotheses 742, energy metrics 744, and tracking recovery frequency 746. The PBCH-based frequency error detection component 720 may further include FTL updater 750, operating conditions 760, and PBCH decoder 770 having PBCH 772.

The detector 730 may be configured to detect a change in frequency that exceeds a pull-in range of FTL 710. The frequency identifier 740 may be configured to identify the tracking recovery frequency 746 in response to the change in frequency being detected, wherein the tracking recover frequency 746 is identified from the set of frequency hypotheses 742, and wherein the tracking recovery frequency 746 is identified based on decoding of PBCH 772 received by the UE 702. The PBCH 772 may be decoded by PBCH decoder 770. FTL updater 750 may be configured to update FTL 710 with tracking recovery frequency 746.

In another aspect, detecting a change in frequency by detector 730 may include detecting that the change in frequency exceeds a respective threshold 732 based on one or more characteristics of a wireless channel. In addition, detecting a change in frequency may include detecting more than one characteristic that indicates a change in frequency that exceeds a pull-in range of FTL 710. Detecting more than one characteristic may include detecting that each of the more than one characteristic exceeds a respective threshold 732. The characteristics that may be considered may be stored or otherwise identified in characteristic types 734 and may include a change in instantaneous frequency error measured by FTL 710, an image peak in a destaggered channel estimate when the UE 702 combines channel estimates from two staggered reference symbols, a frequency error detected by a synchronization sequence, or a change in phase resulting from correlation between reference signals or synchronization signal apart in time, or any combination thereof. In an aspect, for example, two staggered reference symbols may carry reference signals on different sets of resources elements (REs). In order to fully exploit the frequency resolution of LTE signals, channel estimation needs to be performed over the combined set of reference signal REs over staggered reference symbols. This procedure generates the destaggered channel estimate. In the presence of a frequency error, the destaggered channel estimate may include images which are energy spikes half the distance from the real channel peak. Depending on the frequency error, images may be stronger than the real channel peak or may absorb all the energy from the channel peak. In case of a multi-path channel, the real channel and images may show up as a cluster of energy spikes. As noted above, when more than one characteristic is considered to trigger PBCH-based operations, a respective threshold 732 may be used. The respective threshold 732 for a characteristic that is a sole trigger may be different than the respective threshold 732 for the same characteristic when that characteristic is part of a group of characteristics that trigger PBCH-based operations.

In another aspect, a number (N) of frequency hypotheses in the set of frequency hypotheses 742 and spacing between frequency hypotheses in the set of frequency hypotheses 742 may be based on the operating condition 760 of UE 702.

In yet another aspect, the frequency identifier 740 may be further configured to identify the set of frequency hypotheses 742 based on an operating condition 760 of UE 702, identify one or more frequency hypotheses from the set of frequency hypotheses 742 for which PBCH decoding is successful, and select a frequency hypothesis from the one or more frequency hypotheses, wherein the frequency hypothesis that is selected is used as the tracking recovery frequency 746. PBCH decoding may be successful when the decoded PBCH passes cyclic redundancy check in PBCH decoder 770.

In another aspect, the operating conditions 760 supported by UE 702 may be one or more of offline idle mode discontinuous reception (DRX), online idle mode DRX or connected mode, cell handover, or cell reselection.

The frequency identifier 740 may be configured to select a frequency hypothesis by determining the energy metric 744 for each of the one or more frequency hypotheses, and selecting as the frequency hypothesis of the one or more frequency hypotheses the one with the largest energy metric 744. In some instances, selecting the frequency hypothesis may include determining the energy metric 744 for each of the one or more frequency hypotheses, and when two or more frequency hypotheses of the one or more frequency hypotheses have energy metrics that are substantially similar, selecting as the frequency hypothesis the one frequency hypothesis with smallest absolute frequency of the two or more frequency hypotheses.

In yet another aspect, the frequency identifier 740 may be further configured to identify the tracking recovery frequency 746 by identifying the set of frequency hypotheses 742 for an operating condition 760, determining that none of the frequency hypotheses from the set of frequency hypotheses 742 produce successful PBCH decoding, and assigning zero (0) Hertz as the tracking recovery frequency 746.

In yet another aspect, if UE 702 is in an offline idle mode discontinuous reception (DRX) sleep (e.g., operating condition 760) when the change in frequency is detected, the PBCH-based frequency error detection component 720 may be configured to freeze FTL 710 in its current state, wake up UE 702 from offline idle mode DRX sleep and subsequently place UE 702 back to sleep, wake up UE 702 in online idle mode DRX, and perform, in the online idle mode DRX, the identification of the tracking recovery frequency 746 and the update of FTL 710 with tracking recovery frequency 746.

In another aspect, UE 702 may be in an online idle mode DRX sleep (e.g., operating condition 760) when the change in frequency is detected by detector 730. In yet another aspect, UE 702 may be in a cell handover operation (e.g., operating condition 760) when the change in frequency is detected by detector 730.

In another aspect, if UE 702 is in a cell reselection operation (e.g., operating condition 760) when the change in frequency is detected, the PBCH-based frequency error detection component 720 and/or the frequency identifier 740 may be configured to identify a failure in PBCH decoding of a neighbor cell as the detected characteristic, identify the set of frequency hypotheses 742 that excludes the frequency hypotheses used in the failed PBCH decoding of the neighbor cell, identify one or more frequency hypotheses from the set for which PBCH decoding of the neighbor cell is successful, and selecting a frequency hypothesis from the one or more frequency hypotheses, wherein the frequency hypothesis is used as the tracking recovery frequency 746, and wherein updating FTL 710 with tracking recovery frequency 746 includes initializing FTL 710 with the tracking recovery frequency 746 after UE 702 reselects to the neighbor cell.

The various scenarios described above may be explained in more detail in view of the PBCH-based frequency error detection component 720 in FIG. 7. For example, for a scenario in which UE 702 is in offline idle mode DRX operating condition 760, if the trigger characteristic(s) (e.g., instantaneous frequency error) is smaller than the respective threshold 732, UE 702 continues to finish the normal offline DRX processing. On the other hand, if the trigger characteristic(s) absolute value is larger than the respective threshold, PBCH-based large frequency detection is triggered. In such a case, FTL 710 stops updating once the characteristic is triggered. FTL 710 is kept frozen until PBCH decode is finished by PBCH decoder 770 and FTL 710 is updated by FTL updater 750. The frequency error from the PBCH samples needs to be consistent and in line with the state of FTL 710 at the instant when FTL 710 is updated with the tracking recovery frequency 746. As such, FTL 710 needs to be reactivated after PBCH based frequency detection and correction is complete. If offline to online switch is not supported, offline wakeup is finished and UE 702 is placed back to sleep. Then UE 702 is forced into an early wakeup in online mode if large frequency error is detected by detector 730. If offline to online switch is supported, UE 702 is directly switched from offline mode to online mode. At this point, PBCH-based error detection is scheduled with N different frequency hypotheses (e.g., set of frequency hypotheses 742). Then, the frequency hypotheses to be used as tracking recovery frequency 746 is selected based on energy metric 744 (e.g., largest energy metric 744 is selected or, when multiple hypotheses have similar energy metrics, the one with the smallest absolute frequency is selected). If no frequency hypothesis passes CRC, then 0 Hz is used as tracking recovery frequency 746. Once tracking recovery frequency 746 is identified, FTL 710 may be activated based on tracking recovery frequency 746.

In another example, for a scenario in which UE 702 is in online idle mode DRX or connected mode operating condition 760, as well as for cell handover operating condition 760, if the trigger characteristic(s) (e.g., instantaneous frequency error) is smaller than the respective threshold 732, UE 702 continues to finish normal processing. On the other hand, if the trigger characteristic(s) absolute value is larger than the respective threshold, PBCH-based large frequency detection is triggered. At this point, PBCH-based error detection is scheduled with N different frequency hypotheses (e.g., set of frequency hypotheses 742). Then, the frequency hypotheses to be used as tracking recovery frequency 746 is selected based on energy metric 744 (e.g., largest energy metric 744 is selected or, when multiple hypotheses have similar energy metrics, the one with the smallest absolute frequency is selected). If no frequency hypothesis passes CRC, then 0 Hz is used as tracking recovery frequency 746. Once tracking recovery frequency 746 is identified, FTL 710 may be activated based on tracking recovery frequency 746.

In yet another example, for a scenario in which UE 702 is in cell reselection operating condition 760, FTL 710 may not be available before the neighbor cell PBCH is decoded to get a master information block (MIB) of the target cell. As such, there may not be a way to identify an indication that the pull-in range of FTL 710 has been exceeded by a change in frequency and, consequently, PBCH-based frequency detection may not be triggered. In such a case, it is possible that the neighbor cell PBCH decode fails due to large Doppler frequency difference between target cell and a serving cell. For example, the serving cell and the neighbor cell frequencies may not be synchronized and PBCH failure during cell reselection may be used instead as an indicator that there is a large frequency difference between current serving cell and the target cell. Once this trigger characteristic is detected, the PBCH-based frequency hypotheses solution may be performed. In this case, however, because a group of frequency hypotheses was already used for PBCH decoding of the neighbor cell and those frequency hypotheses resulted in PBCH decoding failure, the PBCH-based frequency hypotheses solution for frequency tracking recovery may rely on a different frequency hypotheses that extend the range of UE 702. At this point, PBCH-based error detection is scheduled with N different frequency hypotheses (e.g., set of frequency hypotheses 742). Then, the frequency hypotheses to be used as tracking recovery frequency 746 is selected based on energy metric 744 (e.g., largest energy metric 744 is selected or, when multiple hypotheses have similar energy metrics, the one with the smallest absolute frequency is selected). If no frequency hypothesis passes CRC, then 0 Hz is used as tracking recovery frequency 746. Once tracking recovery frequency 746 is identified, FTL 710 may be activated based on tracking recovery frequency 746.

Figure 8:
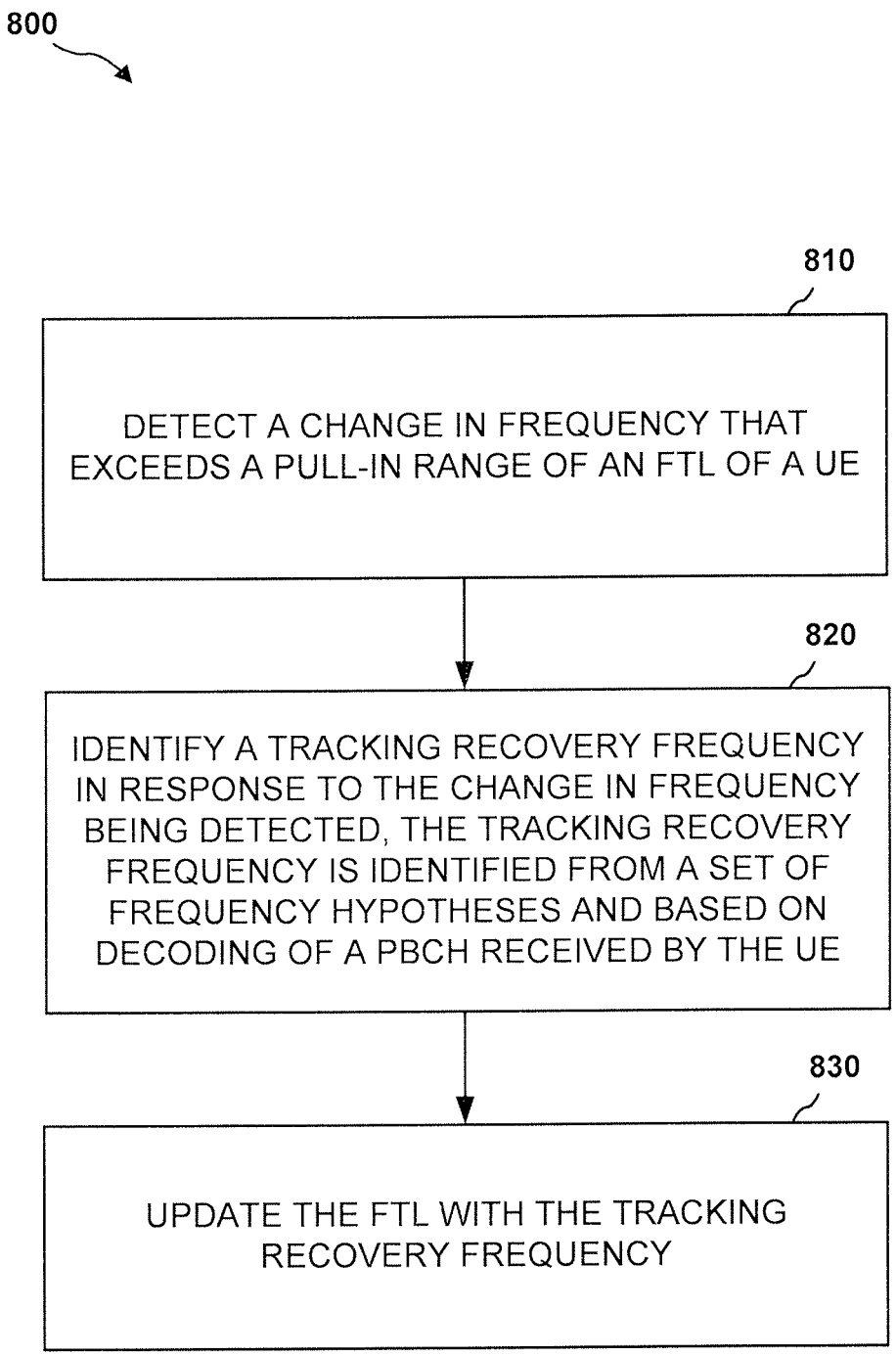
FIG. 8 is a flow chart of an aspect of frequency tracking recovery according to an aspect of the present disclosure, e.g., FIG. 7.
Figure 9:
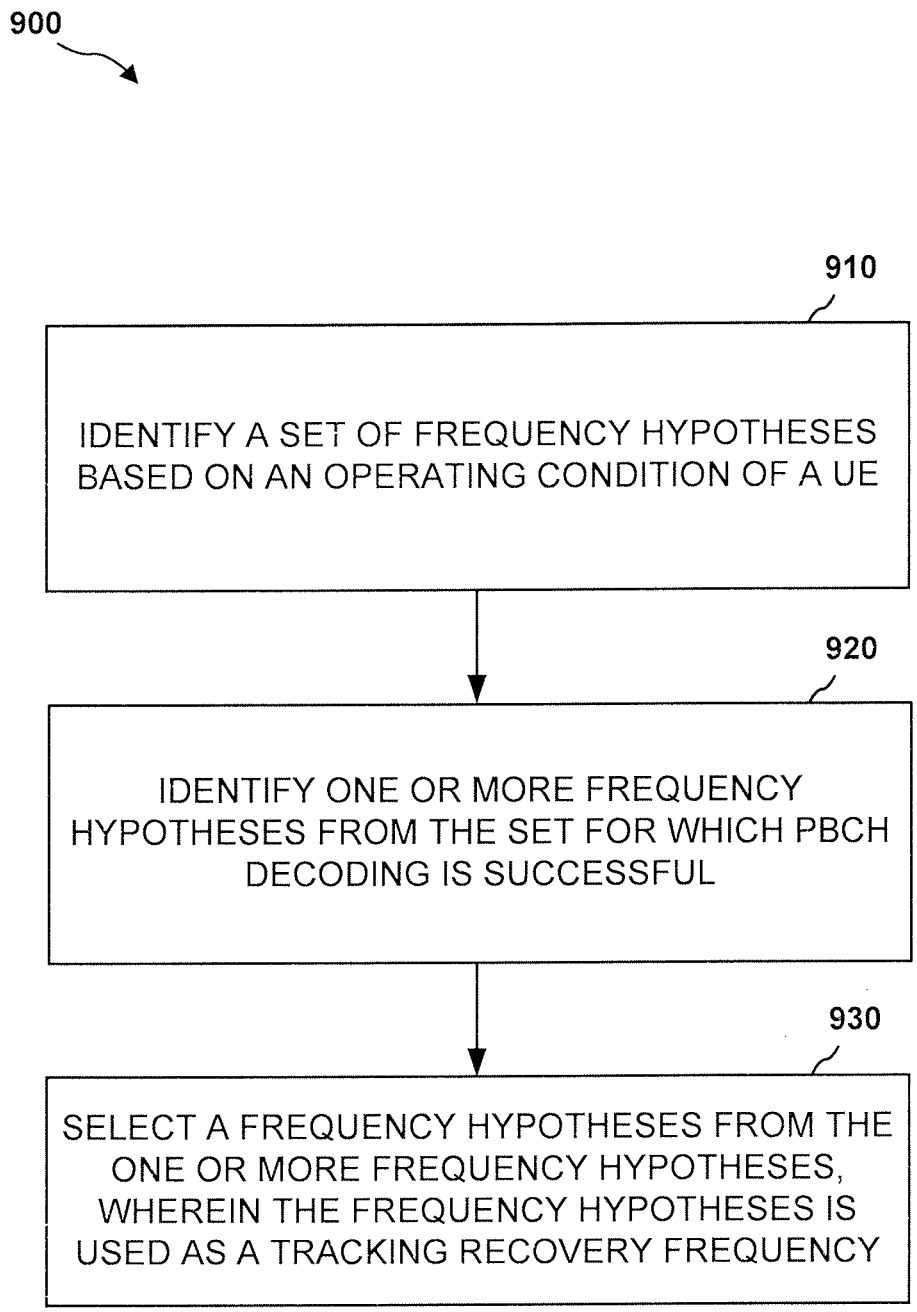
FIG. 9 is a flow chart of another aspect of frequency tracking recovery according to an aspect of the present disclosure, e.g., FIG. 7.

Referring to FIGS. 8 and 9, the methods are shown and described as a series of acts for purposes of simplicity of explanation. However, it is to be understood and appreciated that the methods (and further methods related thereto) are not limited by the order of acts, as some acts may, in accordance with one or more aspects, occur in different orders and/or concurrently with other acts from that shown and described herein. For example, it is to be appreciated that the methods may alternatively be represented as a series of interrelated states or events, such as in a state diagram. Moreover, not all illustrated acts may be required to implement a method in accordance with one or more features described herein.

Referring to FIG. 8, in an operational aspect, a UE such as UE 702 (FIG. 7) may perform one aspect of a method 800 for frequency tracking (e.g., frequency tracking recovery) by PBCH-based frequency error detection component 720. It should be understood that any one or more of the various component and/or subcomponents of PBCH-based frequency error detection component 720 (FIG. 7) may be executed to perform the aspects described herein with respect to each example step forming method 800.

In an aspect, at step 810, method 800 may include detecting a change in frequency that exceeds a pull-in range of an FTL in a UE based on one or more characteristics of a wireless channel. For example, as described herein, PBCH-based frequency error detection component 720 and/or detector 730 (FIG. 7) may detect a change in frequency that exceeds a pull-in range of FTL 710 in UE 702 based on one or more characteristics of a wireless channel (e.g., one or more characteristic types 734). In an aspect, the one or more characteristic types 734 may include an instantaneous frequency error change measured by the FTL 710, an image peak (e.g., a large image peak) in a destaggered channel estimate when the UE 702 combines channel estimates from two staggered reference symbols, a frequency error detected by a synchronization sequence, and a phase change resulting from correlation between reference signals or synchronization signal apart in time. For example, in an aspect, a time tracking loop (TTL) may track the channel energy contained by channel estimates such that PBCH-based detection may be triggered if instantaneous frequency error exceeds a threshold or downlink timing keeps drifting. In an aspect, detecting the timing drift may be performed by checking an instantaneous timing jump of a timing estimator (e.g., a one-shot TTL) which is able to quickly capture the large image peak in the channel estimate. If this timing jump is larger than a threshold (e.g, thresholds 732), trigger PBCH 772 based frequency estimation. In other words, a large frequency error corresponds to a large image peak which is captured by timing estimator and results in the timing jump. In another aspect, detecting the timing drift may be performed by comparing the timing estimate of another timing estimator which does not rely on the channel estimate and the timing tracked by the timing estimator which uses channel estimate. If the difference is larger than a threshold (e.g., thresholds 732), trigger the PBCH 772 based frequency estimation. For example, there are two timing estimators, one is sensitive to frequency error (wideband TTL based on destaggered channel estimate), and the other is not (narrow-band synchronizer/searcher, not based on destaggered channel estimate). As such, if the delta between the two timing estimators is greater than a threshold, then a large frequency error exists, and thus, the PBCH 772 is triggered for the large frequency error.

Furthermore, for example, UE 702 may be operating in an offline idle mode DRX sleep, an online idle mode DRX sleep, or a cell handover operation when the change in frequency is detected. In the instance where UE 702 is in an offline idle mode DRX sleep when, for example, the instantaneous frequency error absolute value exceeds a threshold, PBCH-based frequency error detection component 720 may be further configured to freeze the FTL 710 in its current state. The FTL 710 is kept frozen until PBCH-based frequency error detection component 720 is finished decoding the PBCH 772 and the FTL 710 is updated. Moreover, the frequency error in the PBCH samples needs to be consistent and in line with the FTL 710 state at the instant when the FTL 710 is updated by PBCH frequency estimate. Additionally, PBCH-based frequency error detection component 720 may wake up UE 702 from offline idle mode DRX sleep and subsequently placing UE 702 back to sleep; wake up UE 702 in online idle mode DRX; and perform, in the online idle mode DRX, the identification of the tracking recovery frequency 746 and updating the FTL 710 with the tracking recovery frequency 746.

Moreover, for example, if the UE 702 is in a cell reselection operation when the change in frequency is detected, the UE 702 and/or PBCH-based frequency error detection component 720 may be configured to identify a failure in PBCH 772 decoding of a neighbor cell (e.g., network entity 704 and/or 706) as the detected change in frequency. Additionally, UE 702 and/or PBCH-based frequency error detection component 720 may identify a set of frequency hypotheses 742 that excludes the frequency hypotheses used in the failed PBCH 772 decoding of the neighbor cell, or identify one or more frequency hypotheses 742 from the set for which PBCH 772 decoding of the neighbor cell is successful. As a result, UE 702 and/or PBCH-based frequency error detection component 720 may select a frequency hypothesis from the one or more frequency hypotheses, wherein the frequency hypothesis is used as the tracking recovery frequency 746.

Further, at step 820, method 800 may include identifying a tracking recovery frequency in response to the change in frequency being detected, wherein the tracking recovery frequency is identified from a set of frequency hypotheses, and wherein the tracking recovery frequency is identified based on decoding of a PBCH received by the UE. For instance, as described herein, PBCH-based frequency error detection component 720 and/or frequency identifier 740 (FIG. 7) may identify the tracking recovery frequency 746 in response to the change in frequency being detected, wherein the tracking recovery frequency 746 is identified from the set of frequency hypotheses 742, wherein the tracking recovery frequency 746 is identified based on decoding of PBCH 772 received by UE 702. In an instance, for example, identifying a tracking recovery frequency may include identifying the set of frequency hypotheses 742 for an operating condition (of the one or more operating conditions 760) of the UE 702; determining that none of the frequency hypotheses 742 from the set produce successful PBCH 772 decoding; and assigning zero (0) Hertz as the tracking recovery frequency 746.

At step 830, method 800 may include updating the FTL with the tracking recovery frequency. For example, as described herein, PBCH-based frequency error detection component 720 and/or FTL updater 750 (FIG. 7) may update FTL 710 (FIG. 7) with tracking recovery frequency 746. In some instances, for example, updating the FTL 710 with the tracking recovery frequency 746 includes initializing the FTL 710 with the tracking recovery frequency 746 after the UE 702 reselects to the neighbor cell (e.g., network entity 704 and/or 706).

Referring to FIG. 9, in an additional and/or alternate operational aspect, a UE such as UE 702 (FIG. 7) may perform one aspect of a method 900 frequency tracking (e.g., frequency tracking recovery) by PBCH-based frequency error detection component 720. It should be understood that any one or more of the various component and/or subcomponents of PBCH-based frequency error detection component 720 (FIG. 7) may be executed to perform the aspects described herein with respect to each example step forming method 900.

In an aspect, at step 910, method 900 may include identifying a set of frequency hypotheses based on an operating condition of a UE. For example, as described herein, PBCH-based frequency error detection component 720 and/or frequency identifier 740 (FIG. 7) may identify the set of frequency hypotheses 742 based on the operating condition 760 of UE 702. The operating condition 760 of UE 702 may be one of an offline idle mode DRX, online idle mode DRX or connected mode, cell handover, or cell reselection.

In another aspect, at step 920, method 900 may include identifying one or more frequency hypotheses from the set for which PBCH decoding is successful. For example, as described herein, PBCH-based frequency error detection component 720 and/or frequency identifier 740 (FIG. 7) may identify one or more frequency hypotheses from the set of frequency hypotheses 742 for which PBCH decoding (e.g., by PBCH decoder 770) is successful. The one or more frequency hypotheses from the set of frequency hypotheses 742 may be referred to as a subset of the set of frequency hypotheses 742, where the set of frequency hypotheses 742 include N different frequency hypotheses. In an aspect, for example, PBCH decoding is successful when the PBCH 772 decoded passes cyclic redundancy check.

Additionally, at step 930, method 900 may include selecting a frequency hypothesis from the one or more frequency hypotheses, wherein the frequency hypotheses is used as a tracking recovery frequency. For example, as described herein, PBCH-based frequency error detection component 720 and/or frequency identifier 740 (FIG. 7) may select a frequency hypothesis from the one or more frequency hypotheses (subset of set of frequency hypotheses 742), wherein the frequency hypotheses is used as the tracking recovery frequency 746. In an aspect, selecting a frequency hypothesis 742 includes determining an energy metric for each of the one or more frequency hypotheses 742; and selecting as the frequency hypothesis of the one or more frequency hypotheses 742 the one with a largest energy metric of the determined energy metric for each of the one or more frequency hypotheses 742. In another aspect, selecting a frequency hypothesis includes determining an energy metric for each of the one or more frequency hypotheses 742; and when two or more frequency hypotheses of the one or more frequency hypotheses 742 have energy metrics that are substantially similar, selecting as the frequency hypothesis the one frequency hypothesis with smallest absolute frequency of the two or more frequency hypotheses.

Figure 10:
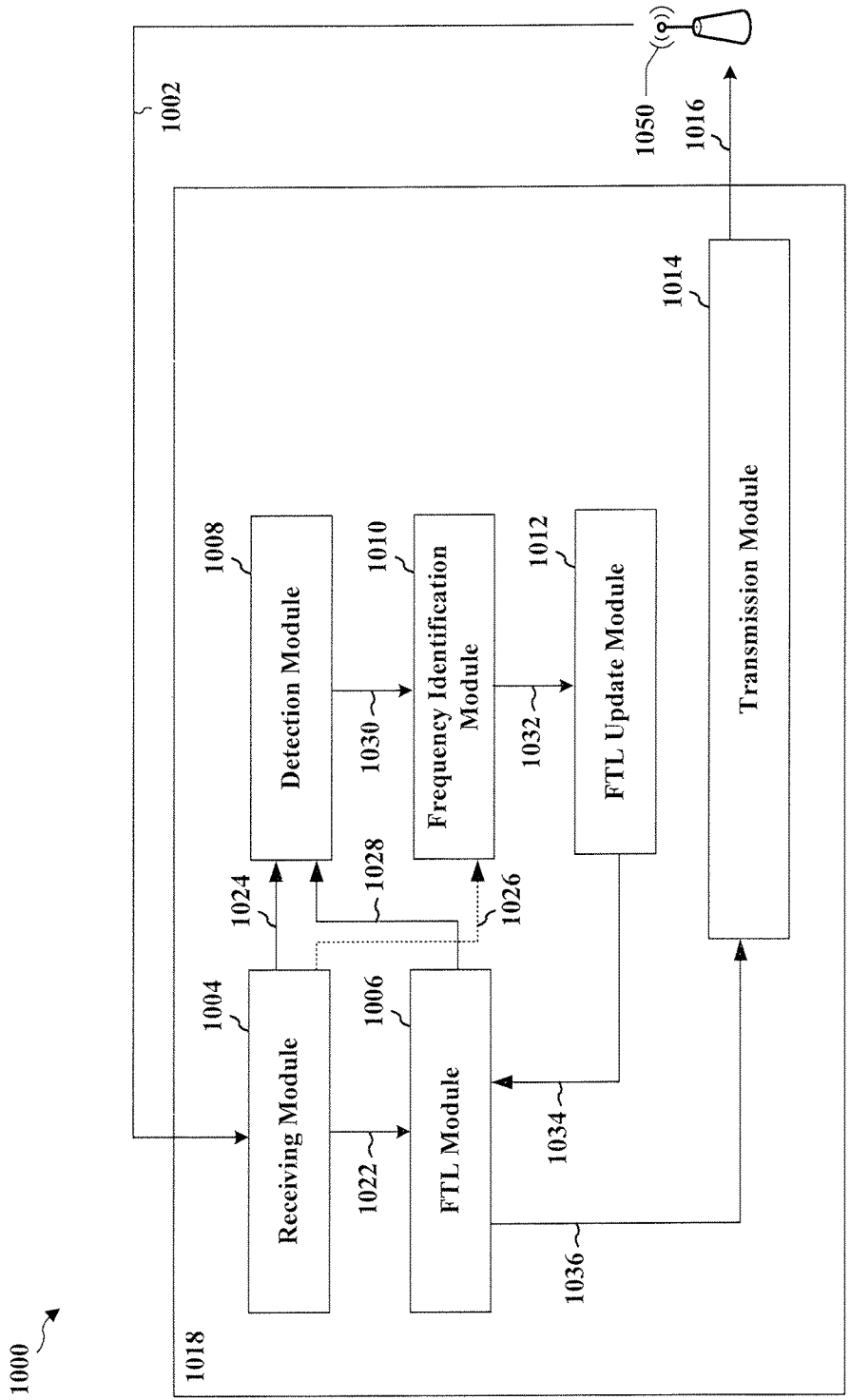
FIG. 10 is a conceptual data flow diagram illustrating the data flow between different modules/means/components in an example apparatus according to an aspect of the present disclosure, e.g., FIG. 7.

Referring to FIG. 10, data flow 1000 illustrates an example flow between different modules/means/components in an example apparatus 1018 according to an aspect of the present disclosure. The apparatus may be a UE, such as UE 702 including PBCH-based frequency error detection component 720 of FIG. 7. Apparatus 1018 includes receiving module 1004 for receiving wireless information 1002 including various signals (e.g., carriers with respective carrier frequencies) and channels (e.g., PBCH) from network entity 1050. In other aspects, network entity 1050 may alternatively be referred to as a cell with which the UE maintains an RRC connected state. Moreover, network entity 1050 may alternatively be referred to as a base station. Further, apparatus 1018 may include FTL module 1006 for tracking frequencies 1022. FTL module 1006 may be based on, for example, a phase-locked loop (PLL) and/or a frequency-locked loop (FLL) operation.

Additionally, apparatus 1018 may include detection module 1008 for detecting that a frequency 1024 change exceeds the pull-in range of FTL module 1006 received via information 1028. Apparatus 1018 may further include frequency identification module 1010 for identifying, based on PBCH decoding operations, a frequency 1026 and 1030 to be used for tracking recovery, as well as FTL update module 1012 for updating FTL module 1006 with the tracking recovery frequency 1034 identified by frequency identification module 1010. Moreover, transmission module 1014 may send/transmit one or more communications 1016 to one or more network entities, including network entity 1050.

The apparatus may include additional modules that perform each of the steps of the process in the aforementioned flow diagram of FIGS. 8 and 9. As such, each step or block in the aforementioned flow diagrams of FIGS. 8 and 9 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 11:
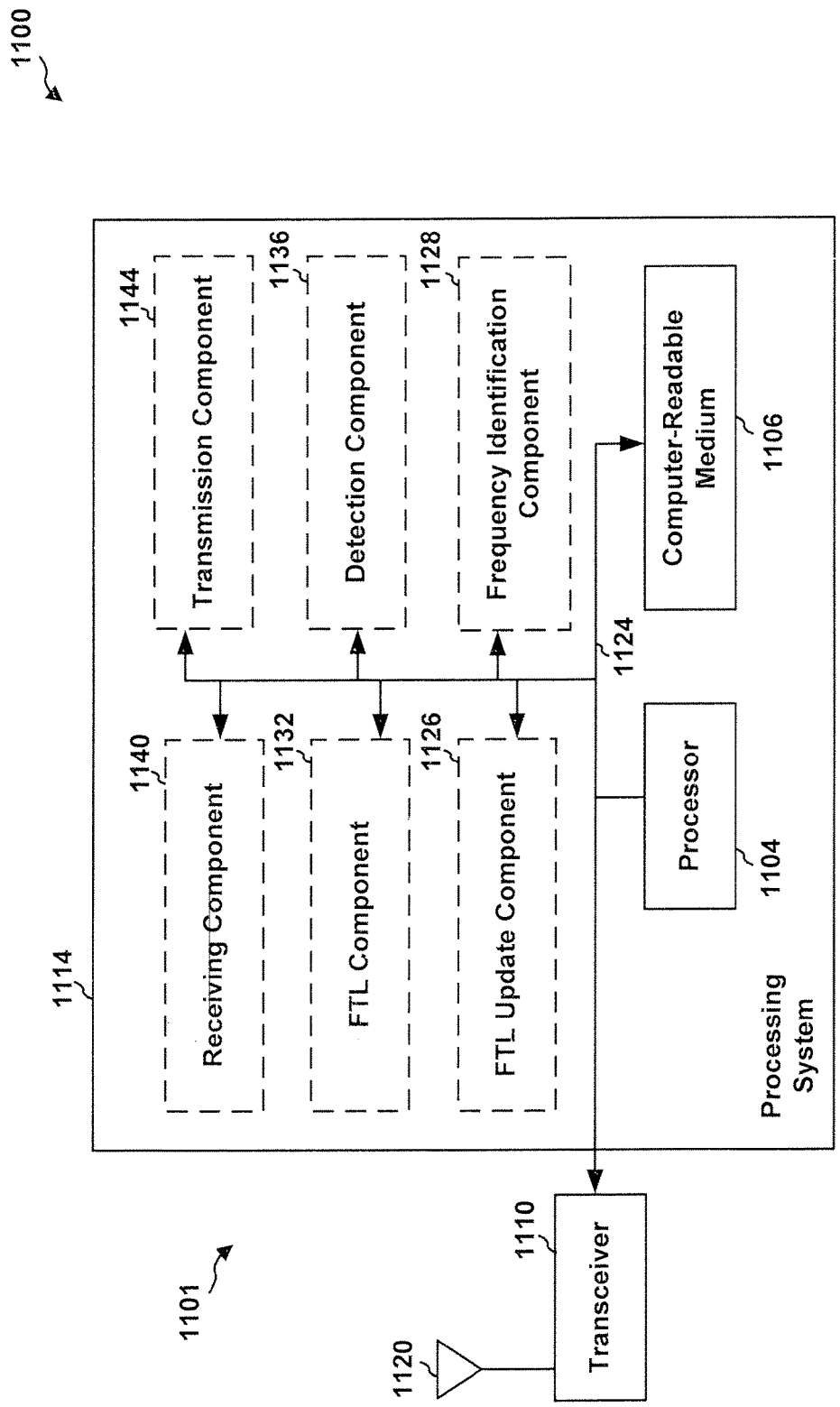
FIG. 11 is a diagram illustrating an example of a hardware implementation for an apparatus employing a processing system according to an aspect of the present disclosure, e.g., FIG. 7.

FIG. 11 is a diagram 1100 illustrating an example of a hardware implementation for an apparatus 1101 employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1126, 1128, 1132, 1136, 1140, 1144, and the computer-readable medium 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The processing system 1114 includes a processor 1104 coupled to a computer-readable medium 1106. The processor 1104 is responsible for general processing, including the execution of software stored on the computer-readable medium 1106. The software, when executed by the processor 1104, causes the processing system 1114 to perform the various functions described supra for any particular apparatus. The computer-readable medium 1106 may also be used for storing data that is manipulated by the processor 1104 when executing software.

The processing system further includes at least one of the components 1126, 1128, 1132, 1136, 1140 and 1144, which may be configured to perform the functions of PBCH-based frequency error detection component 720 (FIG. 7). The components may be software components running in the processor 1104, resident/stored in the computer-readable medium 1106, one or more hardware components coupled to the processor 1104, or some combination thereof. Furthermore, transmission component 1144 may operate with transceiver 1110 or may be part of transceiver 1110. The processing system 1114 may be a component of the UE 650 (FIG. 6) and may include the memory 660 and/or at least one of the TX processor 668, the RX processor 656, and the controller/processor 659. In other aspects, the processing system 1114 may be a component of the UE 702 (FIG. 7) including PBCH-based frequency error detection component 720.

It is understood that the specific order or hierarchy of steps in the processes disclosed is an illustration of example approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for frequency tracking in a user equipment (UE), comprising:
   detecting a change in frequency that exceeds a pull-in range of a frequency tracking loop (FTL) of the UE based on one or more characteristics of a wireless channel, wherein the change in frequency corresponds to a Doppler frequency transition indicating a deviation in frequency from an expected carrier frequency and occurs during a cell reselection procedure to a neighbor cell;
   identifying a tracking recovery frequency in response to the change in frequency that exceeds the pull-in range of the FTL of the UE being detected, wherein identifying the tracking recovery frequency includes:
     identifying a set of physical broadcast channel (PBCH)-based frequency hypotheses based on an operation condition of the UE; and
     determining whether any of the PBCH-based frequency hypotheses from the set of PBCH-based frequency hypotheses produce a successful PBCH decoding of the neighbor cell, wherein the tracking recovery frequency is identified from the set of PBCH based frequency hypotheses and corresponds to a result of an attempted decoding of at least one PBCH of the neighbor cell by the UE; and
   updating the FTL with the tracking recovery frequency based on a determination whether any of the PBCH-based frequency hypotheses from the set of PBCH-based frequency hypotheses produce the successful PBCH decoding, wherein updating the FTL with the tracking recovery frequency includes initializing the FTL with the tracking recovery frequency after the UE reselects to the neighbor cell.

2. The method of claim 1, wherein detecting the change in frequency includes detecting that the change in frequency exceeds a respective threshold.

3. The method of claim 1, wherein detecting a change in frequency includes detecting more than one characteristic that indicates that the change in frequency exceeds the pull-in range of the FTL of the UE.

4. The method of claim 3, wherein detecting more than one characteristic includes detecting that each of the more than one characteristic exceeds a respective threshold.

5. The method of claim 1, wherein the one or more characteristics includes:
   an instantaneous frequency error change measured by the FTL,
   an image peak in a destaggered channel estimate when the UE combines channel estimates from two staggered reference symbols,
   a frequency error detected by a synchronization sequence, or
   a phase change resulting from correlation between reference signals or synchronization signal apart in time, or any combination thereof.

6. The method of claim 1, wherein a number of frequency hypotheses in the set and spacing between frequency hypotheses in the set is based on an operating condition of the UE.

7. The method of claim 1, wherein identifying the tracking recovery frequency includes:
   selecting a frequency hypothesis from the one or more frequency hypotheses for which a corresponding PBCH decoding is successful, wherein the frequency hypothesis that is selected is used as the tracking recovery frequency.

8. The method of claim 7, wherein the operating condition of the UE is one of:
   offline idle mode discontinuous reception (DRX),
   online idle mode DRX or connected mode,
   cell handover, or
   cell reselection.

9. The method of claim 7, wherein selecting a frequency hypothesis includes:
   determining an energy metric for each of the one or more frequency hypotheses; and
   selecting as the frequency hypothesis of the one or more frequency hypotheses the one with a largest energy metric of the determined energy metric for each of the one or more frequency hypotheses.

10. The method of claim 7, wherein selecting a frequency hypothesis includes:
    determining an energy metric for each of the one or more frequency hypotheses; and
    when two or more frequency hypotheses of the one or more frequency hypotheses have energy metrics that are substantially similar, selecting as the frequency hypothesis the one frequency hypothesis with smallest absolute frequency of the two or more frequency hypotheses.

11. The method of claim 7, wherein the at least one PBCH decoding is successful when the at least one PBCH decoded passes cyclic redundancy check.

12. The method of claim 1, wherein identifying the tracking recovery frequency includes:
    assigning zero (0) Hertz as the tracking recovery frequency based on a determination that none of the frequency hypotheses from the set of frequency hypotheses produce the successful PBCH decoding.

13. The method of claim 1, wherein the UE is in an offline idle mode discontinuous reception (DRX) sleep when the change in frequency is detected, the method further comprising:
    freezing the FTL in its current state;
    waking up the UE from offline idle mode DRX sleep and subsequently placing the UE back to sleep;
    waking up the UE in online idle mode DRX; and
    performing, in the online idle mode DRX, the identification of the tracking recovery frequency and updating the FTL with the tracking recovery frequency.

14. The method of claim 1, wherein the UE is in an online idle mode discontinuous reception (DRX) sleep when the change in frequency is detected.

15. The method of claim 1, wherein the UE is in a cell handover operation when the change in frequency is detected.

16. The method of claim 1, wherein the UE is in a cell reselection operation when the change in frequency is detected, the method further comprising:

identifying a failure in the at least one PBCH decoding of the neighbor cell as the detected change in frequency,
identifying the set of PBCH-based frequency hypotheses that excludes the frequency hypotheses used in the failed the at least one PBCH decoding of the neighbor cell;
identifying one or more frequency hypotheses from the set for which the at least one PBCH decoding of the neighbor cell is successful; and
selecting a frequency hypothesis from the one or more frequency hypotheses, wherein the frequency hypothesis is used as the tracking recovery frequency.

17. An apparatus for frequency tracking in a user equipment (UE), comprising:
a memory; and
a processor in communication with the memory, wherein the processor is configured to:
detect a change in frequency that exceeds a pull-in range of a frequency tracking loop (FTL) of the UE based on one or more characteristics of a wireless channel, wherein the change in frequency corresponds to a Doppler frequency transition indicating a deviation in frequency from an expected carrier frequency and occurs during a cell reselection procedure to a neighbor cell;
identify a tracking recovery frequency in response to the change in frequency that exceeds the pull-in range of the FTL of the UE being detected, wherein identifying the tracking recovery frequency includes:
identify a set of physical broadcast channel (PBCH)-based frequency hypotheses based on an operation condition of the UE; and
determine whether any of the PBCH-based frequency hypotheses from the set of PBCH-based frequency hypotheses produce a successful PBCH decoding of the neighbor cell, wherein the tracking recovery frequency is identified from the set of PBCH-based frequency hypotheses and corresponds to a result of an attempted decoding of at least one PBCH of the neighbor cell by the UE; and
update the FTL with the tracking recovery frequency based on a determination whether any of the PBCH-based frequency hypotheses from the set of PBCH-based frequency hypotheses produce the successful PBCH decoding, wherein the processor configured to update the FTL with the tracking recovery frequency is further configured to initialize the FTL with the tracking recovery frequency after the UE reselects to the neighbor cell.

18. The apparatus of claim 17, wherein the processor is further configured to detect that the change in frequency exceeds a respective threshold.

19. The apparatus of claim 17, wherein the processor is further configured to:
detect more than one characteristic that indicates that the change in frequency exceeds the pull-in range of the FTL of the UE, and
detect that each of the more than one characteristic exceeds a respective threshold.

20. The apparatus of claim 17, wherein the one or more characteristics includes:
an instantaneous frequency error change measured by the FTL,
an image peak in a destaggered channel estimate when the UE combines channel estimates from two staggered reference symbols,
a frequency error detected by a synchronization sequence, or
a phase change resulting from correlation between reference signals or synchronization signal apart in time, or any combination thereof.

21. The apparatus of claim 17, wherein a number of frequency hypotheses in the set and spacing between frequency hypotheses in the set is based on an operating condition of the UE.

22. The apparatus of claim 17, wherein the processor is further configured to:
select a frequency hypothesis from the one or more frequency hypotheses for which a corresponding PBCH decoding is successful, wherein the frequency hypothesis that is selected is used as the tracking recovery frequency.

23. The apparatus of claim 22, wherein the operating condition of the UE is one of:
offline idle mode discontinuous reception (DRX),
online idle mode DRX or connected mode,
cell handover, or
cell reselection.

24. The apparatus of claim 22, wherein the processor is further configured to:
determine an energy metric for each of the one or more frequency hypotheses, and
select as the frequency hypothesis of the one or more frequency hypotheses the one with a largest energy metric of the determined energy metric for each of the one or more frequency hypotheses.

25. The apparatus of claim 22, wherein the processor is further configured to:
determine an energy metric for each of the one or more frequency hypotheses, and
select, as the frequency hypothesis, the one frequency hypothesis with smallest absolute frequency of two or more frequency hypotheses of the one or more frequency hypotheses when the two or more frequency hypotheses have energy metrics that are substantially similar.

26. The apparatus of claim 17, wherein the processor is further configured to:
assign zero (0) Hertz as the tracking recovery frequency based on a determination that none of the frequency hypotheses from the set of frequency hypotheses produce the successful PBCH decoding.

27. The apparatus of claim 17, wherein the UE is in an offline idle mode discontinuous reception (DRX) sleep when the change in frequency is detected, wherein the processor is configured to:
freeze the FTL in its current state;
wake up the UE from offline idle mode DRX sleep and subsequently placing the UE back to sleep;
wake up the UE in online idle mode DRX; and
perform, in the online idle mode DRX, the identification of the tracking recovery frequency and updating the FTL with the tracking recovery frequency.

28. The apparatus of claim 17, wherein the UE is in a cell reselection operation when the change in frequency is detected, wherein the processor is configured to:
identify a failure in the at least one PBCH decoding of the neighbor cell as the detected change in frequency,
identify the set of PBCH-based frequency hypotheses that excludes the frequency hypotheses used in the failed the at least one PBCH decoding of the neighbor cell;

identify one or more frequency hypotheses from the set for which the at least one PBCH decoding of the neighbor cell is successful; and select a frequency hypothesis from the one or more frequency hypotheses, wherein the frequency hypothesis is used as the tracking recovery frequency.

29. An apparatus for frequency tracking in a user equipment (UE), comprising:

means for detecting a change in frequency that exceeds a pull-in range of a frequency tracking loop (FTL) of the UE, wherein the change in frequency corresponds to a Doppler frequency transition indicating a deviation in frequency from an expected carrier frequency and occurs during a cell reselection procedure to a neighbor cell;

means for identifying a tracking recovery frequency in response to the change in frequency that exceeds the pull-in range of the FTL of the UE being detected, wherein identifying the tracking recovery frequency includes:

identifying a set of physical broadcast channel (PBCH)-based frequency hypotheses based on an operation condition of the UE; and determining whether any of the PBCH-based frequency hypotheses from the set of PBCH-based frequency hypotheses produce a successful PBCH decoding of the neighbor cell, wherein the tracking recovery frequency is identified from the set of PBCH-based frequency hypotheses and corresponds to a result of an attempted decoding of at least one PBCH of the neighbor cell by the UE; and means for updating the FTL with the tracking recovery frequency based on a determination whether any of the PBCH-based frequency hypotheses from the set of PBCH-based frequency hypotheses produce the successful PBCH decoding, wherein means for updating the FTL with the tracking recovery frequency includes means for initializing the FTL with the tracking recovery frequency after the UE reselects to the neighbor cell.

30. A non-transitory computer-readable medium storing computer executable code for frequency tracking in a user equipment (UE), comprising:

code for detecting a change in frequency that exceeds a pull-in range of a frequency tracking loop (FTL) of the UE, wherein the change in frequency corresponds to a Doppler frequency transition indicating a deviation in frequency from an expected carrier frequency and occurs during a cell reselection procedure to a neighbor cell;

code for identifying a tracking recovery frequency in response to the change in frequency that exceeds the pull-in range of the FTL of the UE being detected, wherein identifying the tracking recovery frequency includes:

identifying a set of physical broadcast channel (PBCH)-based frequency hypotheses based on an operation condition of the UE; and determining whether any of the PBCH-based frequency hypotheses from the set of PBCH-based frequency hypotheses produce a successful PBCH decoding of the neighbor cell, wherein the tracking recovery frequency is identified from the set of PBCH based frequency hypotheses and corresponds to a result of an attempted decoding of at least one PBCH of the neighbor cell by the UE; and code for updating the FTL with the tracking recovery frequency based on a determination whether any of the PBCH-based frequency hypotheses from the set of PBCH-based frequency hypotheses produce the successful PBCH decoding, wherein code for updating the FTL with the tracking recovery frequency includes code for initializing the FTL with the tracking recovery frequency after the UE reselects to the neighbor cell.

* * * * *